United States Patent
Gerovac et al.

(10) Patent No.: US 8,456,814 B2
(45) Date of Patent: Jun. 4, 2013

(54) ENCLOSURE FOR AN ELECTRICAL SYSTEM

(75) Inventors: Joseph P. Gerovac, Menomonee Falls, WI (US); Marek Matuszewski, Franklin, WI (US)

(73) Assignee: Hubbell Incorporated, Shelton, CT (US)

( * ) Notice: Subject to any disclaimer, the term of this patent is extended or adjusted under 35 U.S.C. 154(b) by 191 days.

(21) Appl. No.: 13/037,030

(22) Filed: Feb. 28, 2011

(65) Prior Publication Data

US 2012/0218685 A1 Aug. 30, 2012

(51) Int. Cl.
H05K 7/14 (2006.01)
(52) U.S. Cl.
USPC ... 361/679.01; 361/622; 312/100; 312/223.1; 312/223.2; 312/222; 312/287; 174/50; 174/520
(58) Field of Classification Search
USPC ........... 361/679.01, 679.02; 174/50, 50.51, 174/50.54, 520, 525, 66, 67, 559, 560, 561; 312/215, 217, 218, 222, 223.1–223.6, 249.1, 312/257.1, 265.5, 265.6, 290, 293.1, 287
See application file for complete search history.

(56) References Cited

U.S. PATENT DOCUMENTS

| | | | | |
|---|---|---|---|---|
| 3,543,995 A * | 12/1970 | Wilson | | 229/102 |
| 4,003,610 A * | 1/1977 | Main | | 312/100 |
| 5,177,325 A * | 1/1993 | Giammanco | | 174/50 |
| 5,734,148 A * | 3/1998 | Latvis et al. | | 219/133 |
| 5,860,715 A * | 1/1999 | Lohde et al. | | 312/287 |
| 5,951,825 A | 9/1999 | Land | | |
| 5,997,115 A * | 12/1999 | Radloff et al. | | 312/222 |
| 6,070,824 A | 6/2000 | Du Pont | | |
| 6,089,394 A | 7/2000 | Ziglar | | |
| 6,145,417 A | 11/2000 | Bates et al. | | |
| 6,176,397 B1 | 1/2001 | Robbins et al. | | |
| 6,179,122 B1 | 1/2001 | Moncrief et al. | | |
| 6,216,715 B1 | 4/2001 | Howe | | |
| 6,257,436 B1 | 7/2001 | McGlauflin | | |
| 6,439,424 B1 | 8/2002 | Threadgill, Jr. | | |
| 6,441,307 B1 | 8/2002 | Shotey et al. | | |
| 6,583,358 B1 | 6/2003 | Shotey et al. | | |
| 6,659,440 B2 | 12/2003 | Levy | | |
| 6,688,516 B1 | 2/2004 | Ussen | | |
| 6,698,335 B1 | 3/2004 | Bourgeois | | |
| 6,723,922 B1 | 4/2004 | Shotey et al. | | |
| 6,817,480 B1 | 11/2004 | Baldasio | | |
| 6,827,230 B1 * | 12/2004 | Tuniewicz et al. | | 220/3.8 |
| 6,834,793 B2 | 12/2004 | Sutherland | | |
| 6,872,887 B2 | 3/2005 | Shotey et al. | | |

(Continued)

OTHER PUBLICATIONS

Shallbetter, "Cable Terminating Equipment Pad-Mounted STEN/STEI," 2008, 5 pages.

(Continued)

*Primary Examiner* — Michail V Datskovskiy
(74) *Attorney, Agent, or Firm* — Marcus R. Mickney; Mark S. Bicks; Alfred N. Goodman (57) ABSTRACT

An enclosure for an electrical system is provided. The enclosure includes at least three panels, a support structure, and a top. The support structure supports the at least three panels. The at least three panels are not removable when the top is not opened passed a predetermined. The at least three panels are removable when the top is opened passed the predetermined position.

20 Claims, 5 Drawing Sheets

U.S. PATENT DOCUMENTS

| | | |
|---|---|---|
| 6,942,102 B2 | 9/2005 | Justice |
| 7,021,408 B2 | 4/2006 | Fricker |
| 7,055,272 B2 | 6/2006 | Tollis |
| 7,066,333 B2 | 6/2006 | Justice |
| 7,067,738 B1 | 6/2006 | Shotey et al. |
| 7,131,236 B2 | 11/2006 | Sample et al. |
| 7,175,066 B2 | 2/2007 | Varanasi |
| 7,176,379 B2 | 2/2007 | Shotey et al. |
| 7,198,169 B2 | 4/2007 | Silk |
| 7,230,184 B1 | 6/2007 | Shotey et al. |
| 7,237,476 B1 | 7/2007 | Bourgeois et al. |
| 7,237,547 B1 | 7/2007 | Bourgeois |
| 7,270,259 B2 | 9/2007 | Sutherland |
| 7,325,482 B1 | 2/2008 | Bourgeois et al. |
| 7,345,238 B1 | 3/2008 | Shotey et al. |
| 7,365,973 B2 | 4/2008 | Rasmussen et al. |
| 7,377,565 B1 | 5/2008 | Beavin |
| 7,411,153 B2 * | 8/2008 | Radtke .................... 219/130.1 |
| 7,416,109 B2 | 8/2008 | Sutherland |
| 7,527,179 B2 | 5/2009 | Haimi |
| 7,622,676 B2 | 11/2009 | Drane et al. |
| 7,624,543 B2 | 12/2009 | Sample et al. |
| 7,628,746 B2 | 12/2009 | Varanasi |
| 7,637,372 B2 | 12/2009 | Keel et al. |
| 7,640,848 B1 | 1/2010 | Bourgeois |
| 7,728,226 B2 | 6/2010 | Drane et al. |
| 7,753,420 B2 | 7/2010 | Beavin |
| 7,763,798 B1 | 7/2010 | Shotey et al. |
| 7,766,004 B1 | 8/2010 | Bourgeois |
| 7,770,514 B1 | 8/2010 | Bourgeois et al. |
| 7,779,996 B2 | 8/2010 | Elias et al. |
| 7,799,993 B2 | 9/2010 | Drane et al. |
| 7,820,910 B1 | 10/2010 | Cleghorn et al. |

OTHER PUBLICATIONS

CMC/ESP Utility Products, "Wall-Mounted Termination Enclosures," available at least by Feb. 15, 2011, 10 pages.

Ameren, Distribution Construction Standards, "Equipment Connections Three Phase Multiple Secondary/Service Termination Cabinet," dated Mar. 14, 2007, 7 pages.

Maysteel, Electric Power Products, "Pad Mount Multi-Connection Termination Enclosures," 2010, 4 pages.

* cited by examiner

ENCLOSURE FOR AN ELECTRICAL SYSTEM

BACKGROUND

The present disclosure relates generally to the field of enclosures for an electrical system. More specifically, the present disclosure relates to the field of enclosures suitable for multi-connection electrical equipment for power distribution.

Enclosures are structures which separate contents from the surrounding environment. Some enclosures contain electrical or electronic equipment. These enclosures may provide for mounting of the electrical or electronic equipment, for preventing electrical shock to equipment users, and for protecting the equipment from the environment.

One application for electrical enclosures is to house junctions and couplings of electrical and control wires. In such an application, the enclosure may be located in an industrial or commercial environment or residential neighborhood and receive electrical cables from the secondary side of a transformer (e.g., a utility). The enclosure may also receive electrical cables from multiple electricity consumers (e.g., stores, factories, or houses).

One continuing challenge in the field of power distribution enclosures is in providing access for engineers or electricians to readily access the contents of enclosure. For example, it is often difficult to reach terminals to torque the screws holding the cable termination. Further, it is often difficult to check the torque on screws after installation because of obstructions. Another continuing challenge is in providing access for lifting equipment, such as the hook of a crane, into the enclosure so that the cables may be pulled into the enclosure. Yet another challenge arises when the cables have been pulled to the location prior to placement of the enclosure, but the cables have not been pulled far enough to reach the terminals. In that case, lifting equipment is again required to pull the cables nominally farther.

SUMMARY

One embodiment relates to an enclosure for an electrical system including at least three panels, a support structure, and a top. The support structure supports the at least three panels. The at least three panels are not removable when the top is not opened passed a predetermined. The at least three panels are removable when the top is opened passed the predetermined position.

Another embodiment relates to an enclosure for an electrical system including a top, a support structure, a first panel, and a second panel. The support structure includes a first horizontal beam, a second horizontal beam, a third horizontal beam, a first vertical beam, a second vertical beam, and a third vertical beam. The first vertical beam couples to the first horizontal beam and the second horizontal beam. The second vertical beam couples to the second horizontal beam and the third horizontal beam. The third vertical beam couples to the third horizontal beam. The support structure supports a first panel, and a second panel. The first panel and the second panel are not removable when the top is in a first position, and the first panel and the second panel are removable when the top is in a second position.

Another embodiment relates to an enclosure for an electrical system including a top, a bottom, and a support structure. The support structure includes at least one panel which is removable when the top is in a predetermined position, and the support structure defines a perimeter that is substantially round.

DETAILED DESCRIPTION OF THE EXEMPLARY EMBODIMENTS

Referring to the FIGURES, an enclosure for an electrical system and components thereof are shown according to exemplary embodiments. The enclosure generally includes a support structure and a top. According to one embodiment, the enclosure further includes a bottom. The support structure supports a plurality of panels which are removable when the top is open passed a predetermined position. Removing the panels may facilitate access to the contents of the enclosure.

According to an exemplary embodiment, the enclosure is used for electric power distribution. As such, the enclosure may be located in an industrial or commercial environment or residential neighborhood and receive electrical cables from the secondary side of a transformer (e.g., a utility). In this role, the enclosure may receive 600 Volts and 6000 Amps. According to one embodiment, the enclosure includes an electric stack which may distribute electrical power to multiple electricity consumers (e.g., stores, factories, houses, etc.). The exemplary embodiments shown may be constructed for either indoor or outdoor use, to provide a degree of protection to users against incidental contact with the enclosed equipment; to provide a degree of protection against falling dirt, rain, sleet, and snow; and to be undamaged by the external formation of ice on the enclosure.

Before discussing further details of the enclosure, it should be noted that references to "front", "back", "rear", "upper", "lower", "right", and "left" in this description are merely used to identify the various elements as they are oriented in the FIGURES, with "front", "back", and "rear" being relative to a specific direction. These terms are not meant to limit the element which they describe, as the various elements may be oriented differently in various applications.

It should further be noted that for purposes of this disclosure, the term coupled means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figures 1, 2:
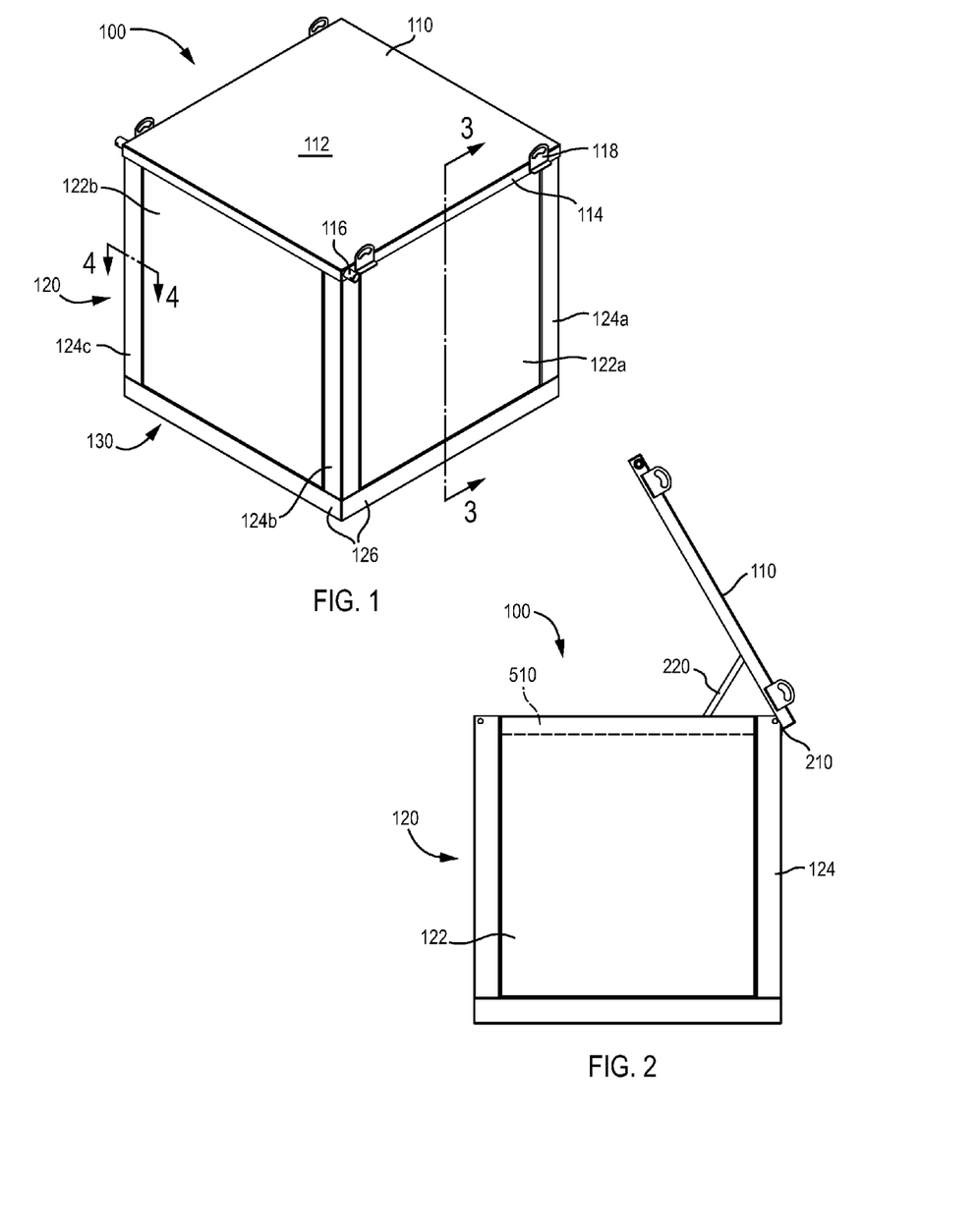
FIG. 1 is an isometric view of an enclosure according to an exemplary embodiment.
FIG. 2 is a side elevation view of an enclosure according to an exemplary embodiment.

Referring to FIG. 1, an isometric view of an enclosure 100 is shown according to an exemplary embodiment. Enclosure 100 is shown to include a top (e.g., cover, roof, etc.), shown as lid 110 and a support structure 120. Enclosure 100 may be made of any suitably rigid material, such as ceramic, composite, metal, etc. According to one exemplary embodiment, enclosure 100 is a substantially rigid enclosure made of aluminum. According to the exemplary embodiment shown, enclosure 100 is substantially cubical with dimensions of approximately four feet per side. In alternate embodiments, enclosure 100 may be elongated or shortened in one or two dimensions to form a non-cubical box. As such, referring to components (e.g., horizontal beams) by a single reference numeral does not preclude embodiments in which the components may be of different dimensions. Furthermore, alternate embodiments of enclosure 100 may include non-cubic shapes, for example circular, triangular, or higher order polygons, etc.

According to the exemplary embodiment shown, enclosure 100 includes support structure 120. Support structure 120 may include a frame which supports one or more panels 122. The frame includes one or more vertical beams (e.g., elongated members, channels, tubing, etc.), shown as posts 124, and horizontal beams (e.g., elongated members, channels, tubing, etc.). According to the embodiment shown, enclosure 100 includes a first post 124a, a second post 124b, a third post 124c, and a fourth post 124d (shown in FIG. 5). The vertical and horizontal beams may be fabricated in a variety of manners, e.g., forged, bent, stamped, extruded, etc. The vertical and horizontal beams may be coupled by any suitable manner such as welds, fasteners, screws, rivets, etc. According to the embodiment shown, the frame is all welded. Any type of appropriate seals, adhesives, or caulk for an electrical environment can be used.

Figure 5:
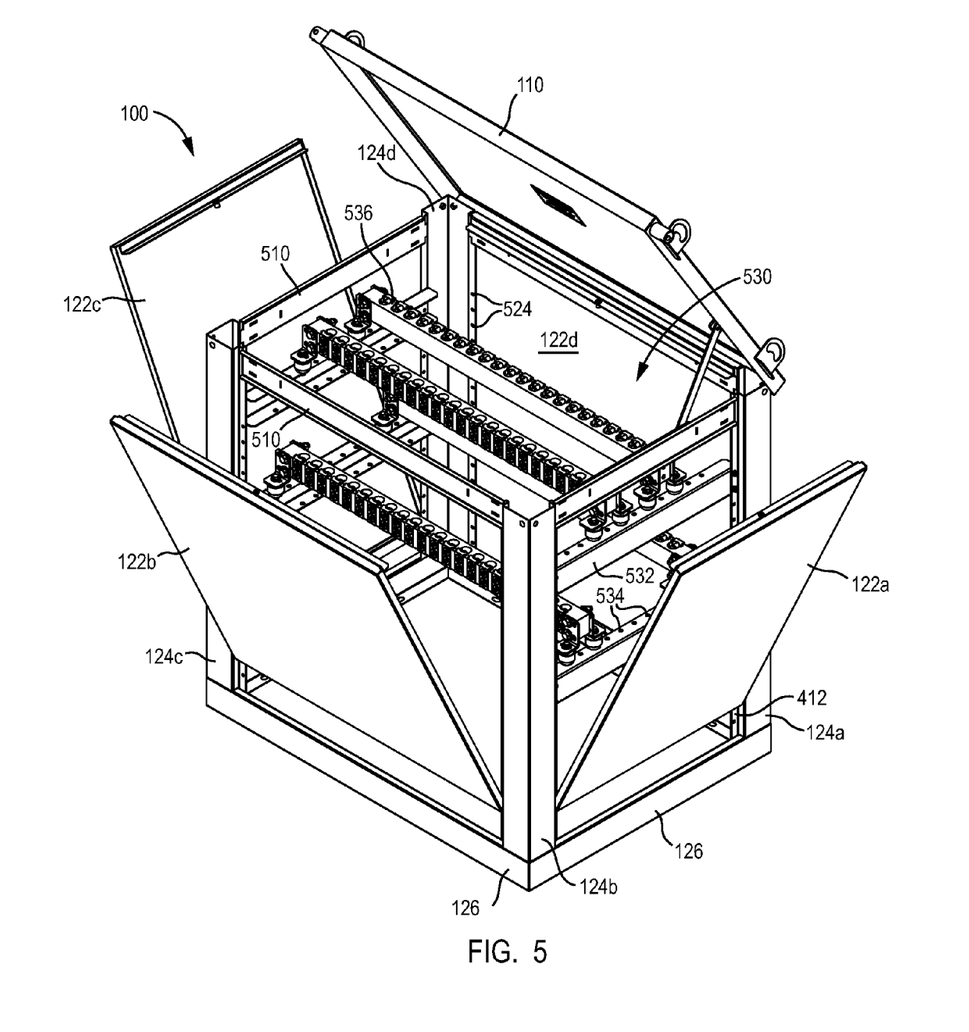
FIG. 5 is an isometric view of an enclosure showing panels removable according to an exemplary embodiment.

Referring to FIGS. 1 and 5, the frame of the exemplary embodiment includes bottom horizontal beams, shown as lower beams 126, and top horizontal beams, shown as upper beams 510. According to one exemplary embodiment, posts 124 may couple to upper beams 510. According to another exemplary embodiment, posts 124 may couple to lower beams 126. As shown, top portions of posts 124 couple to upper beams 510, and bottom portions of posts 124 couple to lower beams 126.

Figure 3A:
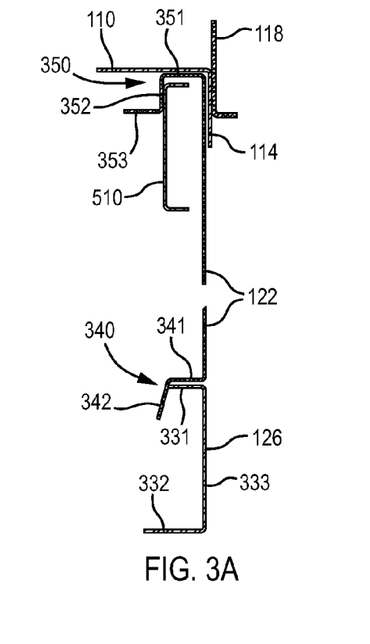
FIG. 3A is a vertical cross-sectional view of an enclosure taken through a line 3-3 of FIG. 1 according to an exemplary embodiment.
Figure 3B:
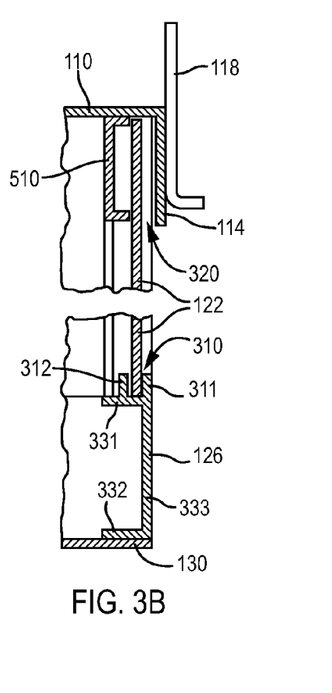
FIG. 3B is a vertical cross-sectional view of an enclosure taken through a line 3-3 of FIG. 1 according to an alternative embodiment.

Referring to FIGS. 3A and 3B, cross-sectional views of enclosure 100 taken through a line 3-3 of FIG. 1 are shown according to exemplary and alternative embodiments. As shown, upper beams 510 have a substantially "C-shaped" cross section with the open portion of the "C" facing out of the enclosure. According to one alternate embodiment, the open portion of the "C" may be configured to receive a gasket to form a seal between panel 122 and upper beam 510. According to another alternate embodiment, the open portion of the "C" may face into the enclosure. In various other alternate embodiments, upper beams 510 may be closed (such as a box beam) and be hollow or solid.

According to the embodiments shown, lower beams 126 have a substantially "C-shaped" cross section with the open portion of the "C" facing into enclosure 100. In alternate embodiments, lower beams 126 may be closed (such as a box beam) and be hollow or solid. Lower beam 126 is shown to include a top flange 331, a bottom flange 332, and a web 333. According to the embodiments shown, top flange 331 and bottom flange 332 may be substantially horizontal, and web 333 may be substantially vertical. As shown in FIG. 3A, top flange 331 and bottom flange 332 have different lengths, and a top portion of top flange 331 is substantially flat. As shown in FIG. 3B, top flange 331 and bottom flange 332 have substantially the same lengths, and a top portion of top flange 331 includes a channel 310 (e.g., groove, slot, depression, etc.) configured to retain a bottom portion of panel 122. According to the embodiment shown, channel 310 and lower beam 126 support a bottom portion of panel 122. As shown, channel 310 and lid 110 cooperatively retain panel 122 to enclosure 100 when lid 110 is in a closed position.

According to the embodiment shown in FIG. 3B, channel 310 is defined by first flange 311, second flange 312, and a top portion of top flange 331. First flange 311 and second flange 312 may have identical or different dimensions. For example, first flange 311 may have a different vertical height as second flange 312. According to the embodiment shown, first flange 311 and second flange 312 have the same height. First flange 311 may cover any percentage (e.g., 100%, 99%, 75%, 50%, 25%, 1%, or 0%) of the length of lower beam 126. Second flange 312 may cover any percentage of the length of lower beam 126. According to one embodiment, the distance between first flange 311 and second flange 312 is approximately the thickness of a bottom portion of panel 122. According to one embodiment, channel 310 is about one inch deep. According to one alternate embodiment, channel 310 may include a gasket to form a seal between panel 122 and lower beam 126.

Figure 4A:
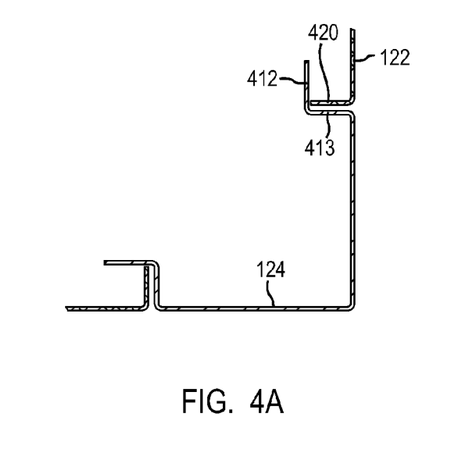
FIG. 4A is a horizontal cross-sectional view of an enclosure taken through a line 4-4 of FIG. 1 according to an exemplary embodiment.
Figure 4B:
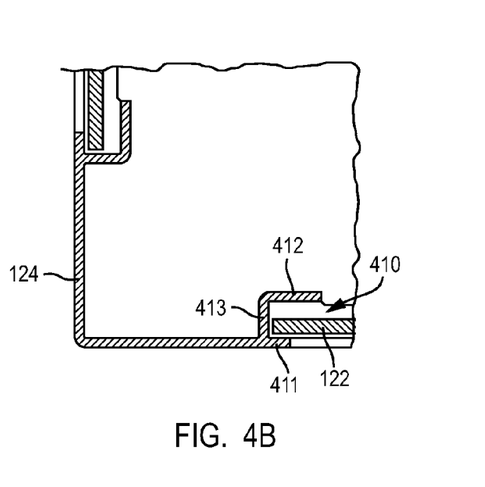
FIG. 4B is a horizontal cross-sectional view of an enclosure taken through a line 4-4 of FIG. 1 according to an alternative embodiment.

Referring to FIGS. 4A and 4B, cross-sectional views of enclosure 100 taken through a line 4-4 of FIG. 1 are shown according to exemplary and alternative embodiments. As shown, posts 124 have a substantially "L-shaped" cross section with the acute portion of the "L" facing into enclosure 100. In other alternate embodiments, posts 124 may be closed (such as a box beam) and be hollow or solid. According to the embodiment shown in FIG. 4B, posts 124 may include a channel 410 (e.g., groove, slot, depression, etc.) configured to retain a side portion of panel 122. Channel 410 may be the same or a different depth than channel 310. According to one embodiment, channel 410 and lid 110 cooperatively retain panel 122 to enclosure 100 when lid 110 is in a closed position.

According to the embodiment shown in FIG. 4B, channel 410 is defined by flanges, creases, etc., shown as first flange 411, a second flange 412, and a web 413. First flange 411 and second flange 412 may cover any percentage of the length of post 124 and may cover the same or different percentages of the length of post 124. As such, channel 410 may cover any percentage of the length of post 124. According to one embodiment, flange 412 covers 100% of the length of post 124 while flange 411 covers about 1% of the length of post 124. According to another embodiment, flange 412 covers substantially all of the length of post 124 while flange 411 covers about one inch of the length of post 124. A horizontal dimension of flange 411 may be the same or different (as shown) as a horizontal dimension of flange 412. According to one embodiment, the distance between first flange 411 and second flange 412 is approximately the thickness of a side portion of panel 122. According to one alternate embodiment, the channel may include a gasket to form a seal between the panel and the post. According to one embodiment, flange 412 covers 100% of the length of post 124, and flange 411 covers 0% of the length of post 124. According to the embodiment shown in FIG. 4A, flange 412 covers substantially all of the length of post 124, and post 124 does not include a flange 411.

Referring to generally to FIG. 1 and to the embodiments in FIGS. 3A and 3B, enclosure 100 may or may not include a bottom 130. According to the embodiment shown in FIG. 3A, enclosure 100 does not include a bottom and may be mounted on a concrete pad. According to one embodiment, enclosure 100 may have an opening on a bottom portion. According to the embodiment shown, enclosure 100 includes an opening defined by lower beams 126. Enclosure 100 may receive cables into the enclosure through the bottom opening.

According to an alternate embodiment shown in FIG. 3B, enclosure 100 includes a bottom. According to one embodiment bottom 130 may be coupled to support structure 120. According to the embodiment shown, bottom 130 is coupled to bottom portions of lower beams 126. According to alternate embodiments, bottom 130 may be coupled to posts 124, to non-bottom portions of bottom horizontal beams 126, and/or bottom 130 may have a skirt which couples to portions of the vertical and/or bottom horizontal beams. According to another alternate embodiment, enclosure 100 does not have lower beams 126, the skirt of bottom 130 couples to posts 124, and bottom 130 may be configured to provide substantial rigidity to enclosure 100.

Referring to the exemplary embodiment shown in FIG. 1, lid 110 includes a top portion 112 and is configured to protect the contents of enclosure 100 from contaminants (e.g., water, dust, debris, etc.). According to alternate embodiments, top portion 112 may have a variety of shapes (e.g., peaked, ridged, domed, etc.). According to the embodiment shown, top portion 112 is substantially flat. Lid 110 may further include a skirt 114 comprised of flanges descending from top portion 112. Skirt 114 overhangs the sides of enclosure 100 and may be configured to retain removable panels 122 when lid 110 is in a closed position (e.g., lowered, first position, substantially closed, etc.). As shown in FIG. 3A, lid 110 secures panel 122 between an underside portion of lid 110 and a top portion of upper beam 510. As shown in FIGS. 3A and 3B, lid 110 secures panel 122 between an inner portion of skirt 114 and upper beam 510. As shown in FIG. 3B, skirt 114, lid 110, and upper beam 510 form a channel 320. Skirt 114 may be configured to protect the contents of enclosure 100 from liquids, water, snow, etc., by directing the liquids over the sides of enclosure 100. According to an alternate embodiment, an underside portion of lid 110 may include one or more gaskets to form a seal against the enclosure's environment. As shown, lid 110 may include a locking mechanism 116 configured to secure lid 110 in a closed position. Locking mechanism 116 may be a Penta Bolt with a padlock provision or any other suitable lock.

Referring to FIG. 2, a profile view of enclosure 100 is shown according to an exemplary embodiment. Lid 110 may be coupled to the frame by any suitable means. According to various exemplary embodiments, lid 110 may be movably, rotatably, pivotably, hingedly, latchedly, and/or removably coupled to support structure 120. According to the exemplary embodiment shown, lid 110 is coupled to at least one post 124 by hinge 210. According to one alternate embodiment, lid 110 may be coupled to at least one top horizontal beam 510. Hinge 210 is shown on an external surface of enclosure 100. According to one alternate embodiment, hinge 210 is located on an internal surface of enclosure 100. Lid 110 is shown passed a predetermined position (e.g., second position, raised, open, a partially open, substantially open, fully open, etc.). Panels 122 may be removable when lid 110 is opened passed a predetermined position.

According to the exemplary embodiment shown, enclosure 100 may include a prop mechanism, such as prop 220. The prop mechanism may be any suitable mechanism for holding lid 110 open. As shown, a first end of prop 220 may be rotatably coupled to lid 110, and a second end of prop 220 may be slidably coupled to an upper beam 510. The second end of prop 220 may engage a fixing structure on upper beam 510. Prop 220 may be decoupled from upper beam 510 in order to remove lid 110. According to one alternate embodiment, the first end of prop 220 may be rotatably coupled to lid 110, and a second end of prop 220 may engage a fixing structure on upper beam 510. According to another alternate embodiment, a first end of prop 220 may be rotatably coupled to upper beam 510, and a second end of prop 220 may engage a fixing structure in lid 110. In another alternate embodiment, the prop mechanism may be a spring loaded linkage system.

According to the exemplary embodiment shown, enclosure 100 includes at least one lifting structure (e.g., lug, hook, eyebolt, etc.), shown as eyelet 118, configured to facilitate lifting of lid 110 and/or enclosure 100. According to an exemplary embodiment, the lifting structure may be coupled to lid 110. As shown, eyelet 118 is coupled to skirt 114. In one alternate embodiment, eyelet 118 may be coupled to the top portion of lid 110. In another alternate embodiment, eyelet 118 may be coupled to one or more posts 124 of the support structure. According to another alternate embodiment, eyelet 118 may be integrally formed in lid 110.

Referring to the exemplary embodiments shown in FIGS. 1 and 5, enclosure 100 includes one or more panels 122 that are supported by the frame. According to the embodiment shown, enclosure 100 includes a first panel 122a, a second panel 122b, a third panel 122c, and a fourth panel 122d. According to various alternate embodiments, the enclosure may include any number of removable and/or fixed panels. Panels 122 may have an inner surface and an outer surface. The inner surface may at least partially define an interior of enclosure 100, and the outer surface may at least partially define an exterior of enclosure 100. As shown in FIG. 1, while installed, panels 122 at least partially define a perimeter of enclosure 100. As shown, panels 122 are identical on each side of enclosure 100. According to alternate embodiments, panels 122 may or may not be identical. Panels 122 may be made from any suitably durable material from any suitable process (e.g., forged, stamped, bent, extruded, etc.). According to the embodiment shown, panels 122 are made from aluminum sheet.

Referring generally to the exemplary embodiment shown in FIGS. 3A, 4A, and 5, panels 122 includes a skirt formed by flanges extending from side, top, and/or bottom portions of panel 122. The skirt may cover any portion of the perimeter of panel 122. According to the embodiment shown in FIG. 5, the skirt substantially encompasses panel 122. According to the embodiment shown in FIGS. 3B and 4B, panels 122 may be substantially flat.

Referring to the exemplary embodiment shown in FIG. 3A, a bottom portion of panel 122 includes a flange 340. Flange 340 includes segments 341 and 342. Flange 340 may be coupled to panel 122 or formed integrally to panel 122. As shown, flange 340 is bent from a bottom portion of panel 122.

According to one embodiment, segment 341 extends from a bottom portion of panel 122. As shown, segment 341 extends from a bottom edge of panel 122. Segment 342 is shown to extend from an end portion of segment 341. In the embodiment shown, segment 342 descends about one inch from segment 342. Segments 341 and 342 may be substantially perpendicular. As shown, segment 342 has a non-perpendicular angle relative to segment 341. The non-perpendicular angle facilitates installation of panel 122 by guiding a bottom portion of panel 122 to an installed position. Segment 341 is shown to be substantially horizontal and to have substantially the same depth dimension as top flange 331. As such, when panel 122 is installed, an outer surface of panel 122 is substantially coplanar to an outer surface of lower beam 126. As shown, when panel 122 is installed, an outer surface of panel 122 is substantially coplanar to an outer surface of web 333. Segments 341 and 342 may cover any percentage of the length of lower beam 126. Segments 341 and 342 may cover the same or different percentages of the length of lower beam 126. According to one exemplary embodiment, segments 341 and 342 cover the length of lower beam 126 between post 124a and post 124b less the width of flanges 412. According to another exemplary embodiment, the length of segments 341 and 342 are approximately the distance between end portions of flanges 412 on adjacent posts 124.

According to the exemplary embodiment shown in FIG. 3A, a top portion of panel 122 includes a flange 350. Flange 350 includes segments 351, 352, and 353. Flange 350 may be coupled to panel 122 or formed integrally to panel 122. As shown, flange 350 is bent from a top portion of panel 122. According to one embodiment, segment 351 extends from a top portion of panel 122. As shown, segment 351 extends substantially horizontally from a top end of panel 122. A depth dimension of segment 351 is shown to be approximately the distance from an interior surface of upper beam 510 to an interior surface of skirt 114. According to one embodiment, the distance from segment 351 to segment 341 is nearly (e.g., marginally less than) the distance from lid 110 to lower beam 126. As shown, the distance from segment 351 to segment 341 is approximately the distance from an underside surface of lid 110 and a top surface of top flange 331. Segment 352 extends from an end portion of segment 351. Segment 352 may or may not be perpendicular to segment 351. As shown, segment 352 is substantially perpendicular to segment 351 and descends vertically about one inch. Segments 342 and 352 may descend from segments 341 and 351 the same or different amounts. Segment 353 is shown to extend from an end portion of segment 352. Segment 353 may or may not be perpendicular to segment 352. As shown, segment 353 is substantially perpendicular to segment 352 and extends substantially horizontally into enclosure 100. Segments 351, 352, and 353 may cover any percentage of the length of upper beam 510. Segments 351, 352, and 353 may cover the same or different percentages of the length of upper beam 510. As shown in FIG. 5, segment 351 covers about 100% of a top portion of panel 122 while segments 352 and 353 cover less than 100% of a top portion of panel 122. According to one exemplary embodiment, the length of segments 352 and 353 are approximately the distance between end portions of flanges 412 on adjacent posts 124.

Referring to the exemplary embodiment shown in FIG. 4A, a side portion of panel 122 includes a flange 420. Flange 420 may be coupled to panel 122 or integrally formed with panel 122. As shown flange 420 is bent from a side portion of panel 122. According to one embodiment, flange 420 extends from a side portion of panel 122. As shown, flange 420 extends substantially perpendicularly to an outer surface of panel 122 from a side end of panel 122. According to various embodiments, a panel 122 may have no flanges 420, a panel 122 may have a flange 420 only on one side of the panel, or a panel 122 may have a flange 420 on each side of the panel. Flange 420 may cover any percentage of the length of panel 122. Flange 420 is shown to cover substantially all of the height of panel 122. According to the embodiment shown, a depth dimension of flange 420 is approximately the distance from flange 412 to an outer surface of post 124. As such, when panel 122 is installed, an outer surface of panel 122 is substantially coplanar to an outer surface of post 124.

Panels 122 are configured to be selectively removable relative to the frame. Removing panels 122 may facilitate access to the contents of the enclosure from all sides thus facilitating use and manipulation of the contents of the enclosure. Allowing panels 122 to be selectively removable from the frame may facilitate maintenance and/or repair of enclosure 100 or its contents. Facilitating maintenance and/or repair may include, for example, servicing enclosure 100 without de-energizing the contents or removing the contents from service, facilitating visual and/or infrared inspection of the contents of enclosure 100, facilitating applying or checking torque to portions of the contents of enclosure 100 (e.g., screws on terminals), and/or replacing individual panels 122 which may be damaged. Facilitating visual or infrared inspection may include improving lines of sight, e.g., for thermal imaging of individual cables or terminals. In use, lifting or pulling equipment (e.g., crane, hoist, winch, etc.) may be necessary to pull or lower contents (e.g., cables, etc.) into enclosure 100. Panels 122 and/or lid 110 may be removed to facilitate positioning (e.g., pulling, pushing, lowering, raising, orienting, etc.) contents in enclosure 100 or to facilitate access of the lifting or pulling equipment into enclosure 100.

According to an exemplary embodiment, panels 122 are configured to be removed when lid 110 is opened passed a predetermined position. According to the embodiment shown, the predetermined position is an attached and intermediate position of lid 110 that is between an open position and a closed position. According to one alternate embodiment, opening lid 110 passed the predetermined position allows only panels 122a, 122b, and 122c to be removed. By configuring panels 122 to be removable without requiring lid 110 to be first removed, the entire weight of lid 110 may not need to be lifted in order to remove panels 122. For example, according to the embodiment shown, hinge 210 supports at least a portion of the weight of lid 110 when lid 110 is in a position that allows for panels 122 to be removed.

According to an exemplary embodiment, panels 122 may not be removable when lid 110 is in a closed position. According to one alternate embodiment, panels 122 may not be removable when lid 110 is not opened passed a predetermined position. According to another alternate embodiment, panels 122 may be removed if lid 110 is removed from the frame.

According to an exemplary embodiment, panels 122 are secured to enclosure 100 without hardware. Securing panels 122 to enclosure 100 without hardware may reduce the time necessary to remove and/or reinstall panels 122 relative to enclosure 100. Securing panels 122 without hardware and/or removing lid 110 may enable enclosure 100 to be moved in pieces, for example, off of a delivery truck. The ability to move enclosure 100 in pieces may enable moving by individual workers and negate the need for lifting equipment. According to one exemplary embodiment, enclosure 100 may be broken down into individual components which may be lifted or manipulated by a single user or a team of users. According to one embodiment, sheet metal used for the panels or lid may be between 0.1 and 0.25 inch thick. According to the embodiment shown, the enclosure is constructed of one-eighth inch thick sheet aluminum. According to one exemplary embodiment, the frame or each panel 122 or lid 110 weighs between 40 and 50 pounds. According to another exemplary embodiment, each panel 122 or lid 110 weighs between 30 and 40 pounds. According to another exemplary embodiment, each panel 122 or lid 110 weighs between 20 and 30 pounds. According to another exemplary embodiment, each panel 122 or lid 110 weighs between 20 and 40 pounds. Panels 122 and lid 110 may or may not have the same weight. According to the embodiment shown, lid 110 weighs about 35 pounds, each panel 122 weighs about 25 pounds, and the empty frame weighs about 47 pounds. Weights of panels 122, lid 110, and the frame may vary by size of enclosure 100, construction methods, and construction materials.

Referring generally to FIGS. 3-5, retention, removal, and installation of panels 122 relative to enclosure 100 is described according to exemplary embodiments. Panels 122 may be secured to enclosure 100 in a variety of different ways. According to one embodiment, lower beam 126 and lid 110 cooperate to retain panel 122 to enclosure 100. For example, the distance from a underside portion of lid 110 to a top portion of lower beam 126 is approximately a height dimension of panel 122. According to the embodiment shown in FIG. 3B, channel 310 and channel 320 cooperate to retain panel 122. For example, the sum of the depths of channel 310 and channel 320 exceeds the difference of the distance from an underside portion of lid 110 to a top portion of lower beam 126 and a height dimension of panel 122. According to the embodiment shown, panel 122 is positioned such that a bottom portion of panel 122 is disposed in channel 310 and a top portion of panel 122 is disposed in channel 320. As shown, channel 320 is deeper than channel 310. According to alternate embodiments, channel 310 is as deep or deeper than channel 320. Channel 310 may be configured to support panel 122 to hold panel 122 in an upright position while lid 110 is not in a closed position. For example, channel 310 may be sufficiently deep to hold panel 122 in an upright position while lid 110 is not in a closed position. According to one embodiment, channel 310 is configured to prevent unauthorized removal of panel 122. For example, channel 310 may be configured to prevent prying of a bottom portion of panel 122 away from enclosure 100.

According to another exemplary embodiment, posts 124 and lid 110 cooperate to retain panel 122. For example, the distance between adjacent posts 124 is approximately a width dimension of panel 122. According to the embodiment shown in FIG. 4B, channel 410 and lid 110 cooperate to retain panel 122. Channel 410 may work alone or in cooperation with a corresponding channel on a corresponding vertical post to retain panel 122 between the cooperating vertical posts. According to one alternate embodiment, the sum of the depths of channel 410 on post 124a and channel 410 on post 124b exceeds the difference of the distance from post 124a to post 124b and a width dimension of panel 122a. According to another alternate embodiment, the depth of channel 410 on post 124a exceeds the difference of the distance from post 124a to post 124b and a width dimension of panel 122a. According to one embodiment, channel 410 is configured to prevent unauthorized removal of panel 122. For example, channel 410 may be configured to prevent prying of a side portion of panel 122 away from enclosure 100.

According to the exemplary embodiments shown in FIGS. 3A, 4A, and 5, lid 110, posts 124, lower beam 126, and upper beam 510 cooperate to retain panel 122. Segments 352 and 353 contact upper beam 510 and lower beam 126, respectively, to limit outward movement of panel 122. Flanges 420 contact flanges 412 to limit inward movement of panel 122. Flanges 420 contact flanges 413 to limit horizontal movement of panel 122. Segments 341 and 351 contact top flange 331 and lid 110 to limit vertical movement of panel 122. According to one embodiment, a height dimension of segment 352 exceeds the difference of the distance from an underside portion of lid 110 to a top portion of lower beam 126 and a height dimension of panel 122. According to the embodiment shown the distance from segments 351 to 353 exceeds the difference from an underside surface of lid 110 to a top surface of top flange 331 and a height dimension of panel 122. According to one embodiment, a height dimension of segment 342 exceeds the difference of the distance from an underside portion of lid 110 to a top portion of lower beam 126 and a height dimension of panel 122. According to the embodiment shown a vertical dimension of segment 342 exceeds the difference from an underside surface of lid 110 to a top surface of top flange 331 and a height dimension of panel 122.

Generally, to remove a panel 122, lid 110 is opened passed a predetermined position if it is not already opened passed the predetermined position, and panel 122 is removed from enclosure 100. For example, lid 110 may be raised from a closed position to passed a predetermined position. If present, prop mechanism 220 may be set to support lid 110. According to an alternate embodiment, lid 110 may be removed. According to an embodiment in which panel 122 is supported in channel 310, panel 122 may be lifted out of channel 310 and moved away from enclosure 100. Panel 122 may be lifted by a handle (not shown) coupled to or formed into panel 122. According to an embodiment in which a plurality of channels 410 are working in cooperation to retain panel 122, panel 122 may be lifted upwardly out of channels 410 and moved away from enclosure 100. According to an embodiment in which each post includes only one channel 410, a portion of panel 122 distal from channel 410 is moved away from enclosure 100, a portion of panel 122 proximate to channel 410 is moved sidewardly out of channel 410, and panel 122 is moved away from enclosure 410. According to the embodiment shown in FIGS. 3A, 4A, and 5, segment 353 may be used as a handle to lift panel 122. Panel 122 may be lifted such that segments 342 and 352 are above top flange 331 and upper beam 510, respectively, and panel 122 may be moved away from enclosure 100. According to one alternative embodiment, panel 122 is lifted such that segment 352 is above upper beam 510, an upper portion of panel 122 is rotated away from enclosure 100, and panel 122 is moved away from enclosure 100.

One of skill in the art will understand from this disclosure that to install panels 122, the removal steps described above are performed substantially in reverse for their respective embodiments. Preferably, the frame is configured to arrest panels 122 until lid 110 is closed. Arresting panels 122 may include substantially holding upright and/or in such position that closing lid 110 will secure panels 122 to enclosure 100. According to one exemplary embodiment, panel 122 may be arrested by flange 350 overhanging upper beam 510. According to another exemplary embodiment, panel 122 is arrested by segment 352 contacting an inner surface of upper beam 510. According to the embodiment shown in FIG. 3A, the distance from segment 352 to an exterior surface of panel 122 is approximately the distance from an interior surface of upper beam 510 to an interior surface of skirt 114. As such, flange 350 secures panel 122 to the frame when lid 110 is not in a closed position. According to various alternate embodiments, panels 122 may be arrested by channel 310, channel 410, or a combination of channels 310 and 410. Configuring the frame to arrest panels 122 enables a user to install one of panels 122 and then install subsequent panels 122 or lid 110 without having to secure the previously installed panels to enclosure 100. According to one embodiment, the frame is configured such that previously installed panels do not fall out of enclosure 100 while installing subsequent panels 122, installing lid 110, or closing lid 110. Configuring the frame to arrest panels 122 further enables a user to keep fingers and hands clear of panels 122 while closing lid 110.

Referring to FIG. 5, according to one exemplary embodiment, the contents of the enclosure may be electronic or electrical equipment. According to one exemplary embodiment, the contents of enclosure 100 may be an electric stack. According to the exemplary embodiment shown, the contents of enclosure 100 may be a reconfigurable electrical stack 530. Electrical stack 530 may include brackets 532 (e.g., beam, brace, tubing, etc.), which may be substantially horizontal, may be substantially vertical, or may be a combination thereof. Brackets 532 may be of various shapes, such as substantially "L-shaped", "C-shaped", or box beams. According to the embodiment shown, brackets 532 are substantially parallel to panel 122*b*. According to one alternate embodiment, the brackets may be installed substantially parallel to panels 122*a* and/or 122*c*. According to another alternate embodiment, brackets 532 may be substantially not parallel to panels 122. According to one exemplary embodiment, brackets 532 may couple to posts 124. According to the embodiment shown, brackets 532 may be fastened to posts 124 through at least one of several mounting positions (e.g., slots, apertures, holes 524, etc.). As shown, holes 524 are located in flange 412. According to one alternate embodiment, brackets 532 include structures (e.g., studs, lugs, tabs, etc.) which may be received by the mounting positions on posts 124. Brackets 532 may be coupled to any set of holes 524. According to the embodiment shown, electric stack 530 may include at least two levels. Preferably, brackets 532 may be mounted to holes 524 such that an electrical clearance of one inch is maintained. As shown, brackets 532 include several bus mounting positions (e.g., slots, apertures, holes 534, etc.). According to various alternate embodiments, bracket 532 may be coupled to upper beams 510, lower beams 126, and/or an upper and a lower beam. According to another alternate embodiment, brackets 532 may be oriented in different directions.

According to the exemplary embodiment shown, electrical stack 530 may include bus 536. Bus 536 may be of any suitable type known to those of skill in the art. According to the exemplary embodiment shown, bus 536 may be a 22 position lay in bus which accepts 1000 kcmil-1/0 cable. The cable may carry electric power (e.g., three-phase power) or signals such as current, voltage, pulse-width-modulation, network protocol, digital or analog audio and/or video, fiber optic, etc. Bus 536 may be mounted to at least one of several holes 534 on brackets 532. As shown, bus 536 may be mounted substantially perpendicular to brackets 532. According to one alternate embodiment, bus 536 may be mounted substantially not perpendicular to brackets 532. Bus 536 may be mounted substantially horizontally, substantially vertically, or any combination thereof.

In use, bus 536 may be moved from one position and/or orientation within enclosure 100 to another. Bus 536 may be moved from one level of bracket to another. For example, if a cable will not reach to a bus at a high level, bus 536 and/or brackets 532 may be lowered so that the cable may reach bus 536. Alternatively, bus 536 and/or brackets 532 may be reoriented vertically such that the cable may reach the bus. Furthermore, it may be necessary to use lifting or pulling equipment to pull the cables. Bus 536 and/or brackets 532 may be removed or reoriented to facilitate access of the lifting or pulling equipment to the cable.

Referring generally for FIGS. 6-9, enclosure 100 may include a fourth panel, such as panel 122*d*, which may be removable when lid 110 is opened passed a predetermined position. Panel 122*d* may be secured to enclosure 100 without hardware. According to one exemplary embodiment, panel 122*d* may not be removable when lid 110 is not opened passed a predetermined position. According to another exemplary embodiment, panel 122*d* may not be removable when lid 110 is in a closed position. According to another exemplary embodiment, panel 122*d* may be removed when lid 110 is removed. According to one alternate embodiment (not shown), lid 110 may pivot about, or proximate to, locking mechanism 116, thus allowing removal of panel 122*d*. According to another alternate embodiment (not shown), skirt 114 of lid 110 may be hinged to allow access to, and removal of, panel 122*d*. The hinged skirt may have a gasket to form a seal against the enclosure's environment. The hinged skirt may have a locking mechanism for security.

Figure 6:
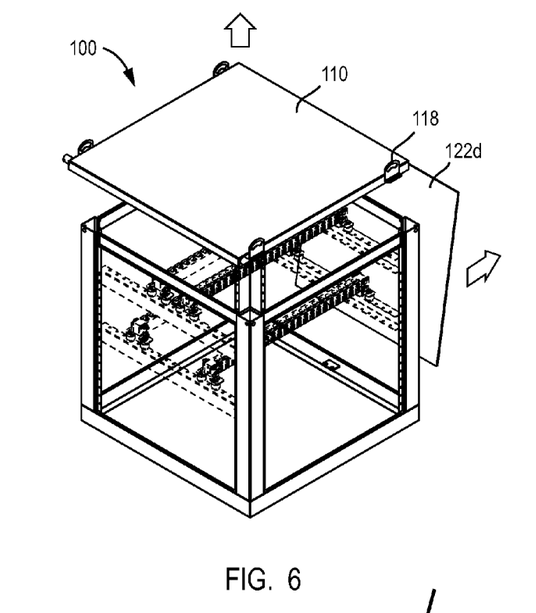
FIG. 6 is an isometric view of an enclosure showing a lid removed according to an exemplary embodiment.

Referring to FIG. 6, an isometric view of enclosure 100 is shown according to an exemplary embodiment. Lid 110 is shown in a removed (e.g., detached) position. As such, panel 122*d* may be removed from enclosure 100. Lid 110 may be removed by direct lifting, or lifting by eyelets 118.

Figure 7:
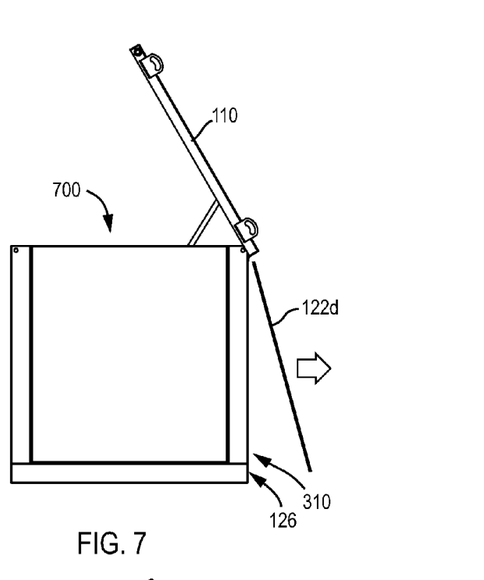
FIG. 7 is a side elevation view of an enclosure according to a first alternate embodiment.

Referring to FIG. 7, a profile view of enclosure 700 is shown according to an alternate embodiment. As shown, when lid 110 is open passed a predetermined position, sufficient clearance may be created between a top portion of panel 122*d* and a bottom portion of lid 110 such that panel 122*d* may be lifted (e.g., by a handle (not shown)) sufficiently such that a bottom portion of panel 122*d* clears a top portion of channel 310 in lower beam 126 (see FIG. 3). The bottom portion of panel 122*d* may be rotated away from enclosure 100, and panel 122*d* may be removed.

Figure 8:
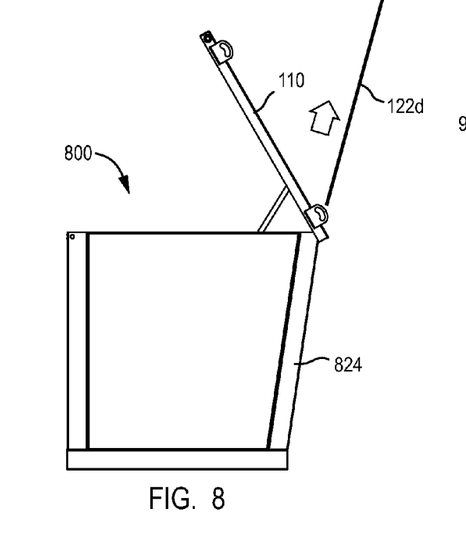
FIG. 8 is a side elevation view of an enclosure according to a second alternate embodiment.

Referring to FIG. 8, a profile view of enclosure 800 is shown according to an alternate embodiment. As shown, the panel 122*d* may be retained at a slight outward angle and may be sufficiently flexible such that a top portion of panel 122*d* may be flexed to clear lid 110 and lifted out of enclosure 800. According to one alternate embodiment, enclosure 800 may include a locking mechanism to secure panel 122*d* when desired. According to the embodiment shown, posts 824 may be non vertical. According to one alternate embodiment, posts 824 may be substantially vertical while retaining panel 122*d* at a non-vertical angle.

Figure 9:
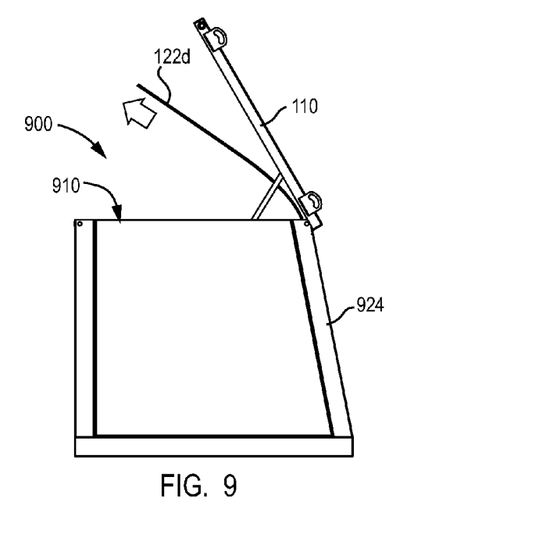
FIG. 9 is a side elevation view of an enclosure according to a third alternate embodiment.

Referring to FIG. 9, a profile view of enclosure 900 is shown according to an alternate embodiment. As shown, the panel 122*d* may be retained at a slight inward angle. When lid 110 is opened passed a predetermined position, sufficient clearance may be created between a top portion of panel 122*d* and a bottom portion of lid 110 such that panel 122*d* may be lifted (e.g., by a handle (not shown)) out of enclosure 900. According to one exemplary embodiment, panel 122*d* is removed through an opening formed by opening lid 110 passed a predetermined position. According to another exemplary embodiment, panel 122*d* is removed through an opening formed by upper beams 910. According to one alternate embodiment, panel 122*d* may be sufficiently flexible such that a top portion of panel 122*d* may be flexed to clear lid 110 and lifted out of enclosure 900 through an opening formed by opening lid 110 passed a predetermined position. According to the embodiment shown, posts 924 may be non-vertical. According to one alternate embodiment, posts 924 may be substantially vertical while retaining panel 122*d* at a non-vertical angle.

Figure 10:
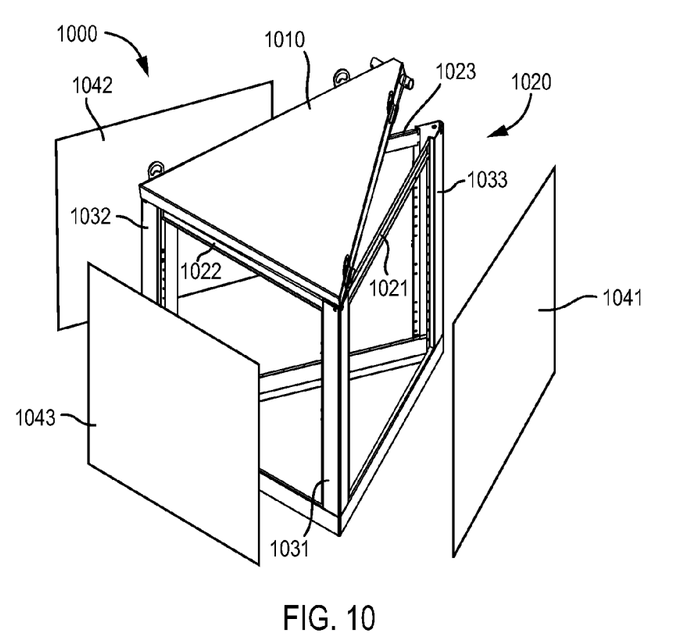
FIG. 10 is an isometric view of an enclosure according to a fourth alternate embodiment.

Referring to FIG. 10, an isometric view of enclosure 1000 is shown according to an exemplary embodiment. As shown, enclosure 1000 may include a top 1010 and a support structure 1020. Support structure 1020 may include a first horizontal beam 1021, a second horizontal beam 1022, and a third horizontal beam 1023. Support structure 1020 may further include a first vertical beam 1031, a second vertical beam 1032, and a third vertical beam 1033. The first vertical beam 1031 may be coupled to the first horizontal beam 1021 and the second horizontal beam 1022, the second vertical beam 1032 may be coupled to the second horizontal beam 1022 and the third horizontal beam 1023, and the third vertical beam 1033 may be coupled to the third horizontal beam 1023. According to the exemplary embodiment shown, the third vertical beam 1033 may be coupled to the first horizontal beam 1021. According to one alternate embodiment, the third vertical beam may couple to a fourth horizontal beam.

According to the exemplary embodiment shown, support structure 1020 supports at least two panels, shown as first panel 1041 and second panel 1042, which may not be removable when top 1010 is in a first position (not shown; e.g., lowered, closed, substantially closed, etc.) and which may be removable when top 1010 is in a second position (e.g., raised, open, partially open, substantially open, etc.). According to one alternate embodiment, the panels may be removed if the lid is removed. According to the exemplary embodiment shown, the support structure may further support a third panel 1043. Third panel 1043 may be removable from the enclosure based on top 1010 being in the second position. Enclosure 1000 may further include contents such as electronic or electrical equipment, an electric stack, and/or a reconfigurable electric stack. According to one exemplary embodiment, brackets (not shown) may be coupled to a plurality of holes in the vertical beams. Electric buses may be attached vertically or horizontally between the brackets. According to one alternate embodiment, brackets may be coupled to horizontal beams.

Figure 11:
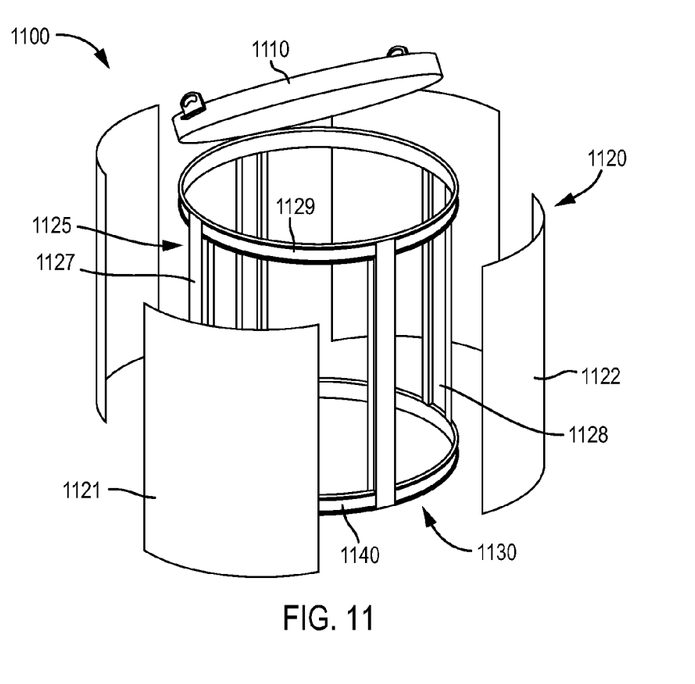
FIG. 11 is an isometric view of an enclosure according to a fifth alternate embodiment.

Referring to FIG. 11, an isometric view of an enclosure 1100 is shown according to an exemplary embodiment. As shown, enclosure 1100 may include a top 1110, a support structure 1120, and a bottom 1130. Support structure 1120 may include a least one panel 1121 which may be removable when top 1110 is open passed a predetermined position. Support structure 1120 may define a perimeter 1125 that may be substantially round. According to one exemplary embodiment, the perimeter may be substantially a conic section. According to the exemplary embodiment shown, perimeter 1125 may be a circle. According to an alternate embodiment, the perimeter may be substantially an oval. According to another alternate embodiment, the perimeter may be substantially ovoid. According to yet another alternate embodiment, the perimeter may be substantially a Reuleaux polygon.

According to the exemplary embodiment shown, support structure 1120 may further include a first vertical beam 1127, a second vertical beam 1128, and a first horizontal beam 1129. As shown, first horizontal beam 1129 need not be linear. First vertical beam 1127 and second vertical beam 1128 may be coupled to first horizontal beam 1129. Support structure 1120 is shown to include panel 1122 which may be removable when top 1110 is open passed a predetermined position. Enclosure 1100 may further include a reconfigurable electric stack. According to one exemplary embodiment, brackets (not shown) may be coupled to a plurality of holes in the vertical beams. Electric buses may be attached vertically or horizontally between the brackets. According to another exemplary embodiment, enclosure 1100 further includes a second horizontal beam 1140 which may be coupled to a bottom portion of first vertical beam 1127 and second vertical beam 1128. Brackets (not shown) may be coupled vertically between first horizontal beam 1129 and second horizontal beam 1140.

It is also important to note that the construction and arrangement of the elements of the enclosure as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from the spirit of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the spirit of the appended claims.

What is claimed is:

1. An enclosure for an electrical system comprising:
   at least three panels;
   a support structure supporting the at least three panels; and
   a top;
   wherein the at least three panels are not removable and detachable when the top is not opened past a predetermined position; and
   wherein the at least three panels are separately removable and detachable from the support structure when the top is opened past the predetermined position.

2. The enclosure of claim 1, wherein the support structure further comprises:
   a first vertical beam;
   a second vertical beam;
   a third vertical beam; and
   a fourth vertical beam;
   wherein the first vertical beam is coupled to a first horizontal beam and a second horizontal beam;
   wherein the second vertical beam is coupled to the second horizontal beam and a third horizontal beam;
   wherein the third vertical beam is coupled to the third horizontal beam and a fourth horizontal beam; and
   wherein the fourth vertical beam is coupled to the fourth horizontal beam and the first horizontal beam.

3. The enclosure of claim 2, wherein the top is pivoted on at least one of the first vertical beam, the second vertical beam, the third vertical beam, or the fourth vertical beam.

4. The enclosure of claim 1, wherein a fourth panel is detachable and removable from the support structure.

5. The enclosure of claim 4, wherein the fourth panel comprises a flexible material allowing the fourth panel to be removable.

6. The enclosure of claim 4, wherein the fourth panel is removable based on the top being opened past the predetermined position.

7. The enclosure of claim 1, wherein the support structure further comprises:
a first vertical beam;
a second vertical beam;
a third vertical beam; and
a fourth vertical beam;
wherein a top portion of the first vertical beam is coupled to a first horizontal beam and a second horizontal beam;
wherein a top portion of the second vertical beam is coupled to the second horizontal beam and a third horizontal beam;
wherein a top portion of the third vertical beam is coupled to the third horizontal beam and a fourth horizontal beam; and
wherein a top portion of the fourth vertical beam is coupled to the fourth horizontal beam and the first horizontal beam.

8. The enclosure of claim 7, wherein a bottom portion of the first vertical beam is coupled to a fifth horizontal beam and a sixth horizontal beam; wherein a bottom portion of the second vertical beam is coupled to the sixth horizontal beam and a seventh horizontal beam; wherein a bottom portion of the third vertical beam is coupled to the seventh horizontal beam and a eighth horizontal beam;
and wherein a bottom portion of the fourth vertical beam is coupled to the eighth horizontal beam and the fifth horizontal beam.

9. The enclosure of claim 7, wherein at least one gasket is connected to at least one of the first horizontal beam, the second horizontal beam, third horizontal beam, or the fourth horizontal beam.

10. The enclosure of claim 7 further comprising a locking device.

11. The enclosure of claim 7 further comprising an electric stack.

12. The enclosure of claim 11, wherein the electric stack is reconfigurable.

13. The enclosure of claim 11, wherein the electric stack comprises at least two levels.

14. The enclosure of claim 1, wherein the panels are not removable when the top is in a closed position.

15. The enclosure of claim 1, wherein a fourth panel is removable based on the top being open past the predetermined position.

16. The enclosure of claim 1 further comprising an exterior; wherein the at least three panels each comprise an exterior surface; and wherein the exterior of the enclosure comprises the exterior surfaces of the at least three panels.

17. An enclosure for an electrical system comprising:
a top;
a support structure; the support structure comprising:
a first horizontal beam;
a second horizontal beam;
a third horizontal beam;
a first vertical beam, the first vertical beam coupled to the first horizontal beam and the second horizontal beam;
a second vertical beam, the second vertical beam coupled to the second horizontal beam and the third horizontal beam; and
a third vertical beam, the third vertical beam coupled to the third horizontal beam;
a first panel, the first panel supported by the support structure; and
a second panel, the second panel supported by the support structure;
wherein the first panel and the second panel are not removable and detachable when the top is in a first position; and
wherein the first panel and the second panel are removable and detachable when the top is in a second position.

18. The enclosure of claim 17 further comprising
a third panel, the third panel supported by the support structure and removable from the enclosure based on the top being in the second position;
wherein the third vertical beam is coupled to the first horizontal beam.

19. A method for assembling an enclosure for an electrical system comprising:
providing a support structure, the support structure comprising:
a first horizontal beam;
a second horizontal beam;
a third horizontal beam;
a first vertical beam, the first vertical beam coupled to the first horizontal beam and the second horizontal beam;
a second vertical beam, the second vertical beam coupled to the second horizontal beam and the third horizontal beam; and
a third vertical beam, the third vertical beam coupled to the third horizontal beam;
providing a first panel, a second panel, and a third panel;
providing a top;
mounting the first panel to the support structure;
mounting the second panel to the support structure; and
mounting the third panel to the support structure;
wherein the first panel, the second panel, and the third panel are not removable and detachable when the top is in a first position; and
wherein the first panel, the second panel, are the third panel are removable and detachable when the top is in a second position.

20. The method of claim 19, wherein mounting the first panel to the support structure comprises mounting the first panel to the first horizontal beam; wherein mounting the second panel to the support structure comprises mounting the second panel to the second horizontal beam; wherein mounting the third panel to the support structure comprises mounting the third panel to the third horizontal beam; wherein the first panel comprises an exterior surface; wherein the second panel comprises an exterior surface; wherein the third panel comprises an exterior surface;
and wherein an exterior of the enclosure comprises the exterior surfaces of the first panel, the second, and the third panel.

* * * * *